US008699684B2

(12) United States Patent
Kim et al.

(10) Patent No.: US 8,699,684 B2
(45) Date of Patent: Apr. 15, 2014

(54) METHOD, SYSTEM, AND PROGRAM PRODUCT FOR CONTACTING CONFERENCE CALL PARTICIPANTS

(75) Inventors: Moon J. Kim, Wappingers Falls, NY (US); John E. Moore, Jr., Brownsburg, IN (US); Eric C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/613,440

(22) Filed: Dec. 20, 2006

(65) Prior Publication Data
US 2008/0152114 A1 Jun. 26, 2008

(51) Int. Cl.
*H04M 3/56* (2006.01)
(52) U.S. Cl.
CPC ..................................... *H04M 3/56* (2013.01)
USPC .................. 379/158; 379/202.01; 379/211.02
(58) Field of Classification Search
USPC .................. 379/156, 202.01, 211.02, 220.01, 379/90.01, 159; 348/14.01–14.16; 270/260, 270/261
See application file for complete search history.

(56) References Cited

U.S. PATENT DOCUMENTS

| | | | |
|---|---|---|---|
| 5,978,463 A | 11/1999 | Jurkevics et al. | |
| 6,072,867 A * | 6/2000 | Lieuwen ................... | 379/220.01 |
| 6,330,320 B1 | 12/2001 | Cornell et al. | |
| 6,920,212 B2 | 7/2005 | Stern et al. | |
| 2002/0030253 A1 | 3/2002 | Grigg et al. | |
| 2002/0077259 A1 | 6/2002 | Skee | |
| 2003/0072428 A1 | 4/2003 | Stern et al. | |
| 2004/0077259 A1 | 4/2004 | Barri | |
| 2004/0101119 A1 | 5/2004 | Malcolm et al. | |
| 2004/0125933 A1 | 7/2004 | Jun et al. | |
| 2005/0018826 A1 | 1/2005 | Benco et al. | |
| 2005/0152523 A1 * | 7/2005 | Fellenstein et al. ...... | 379/202.01 |
| 2006/0045029 A1 | 3/2006 | Ethier et al. | |
| 2006/0177034 A1 * | 8/2006 | Reding et al. ............ | 379/211.02 |
| 2007/0081651 A1 * | 4/2007 | Iyer et al. ................. | 379/202.01 |
| 2007/0218885 A1 * | 9/2007 | Pfleging et al. ............... | 455/416 |
| 2007/0291917 A1 * | 12/2007 | Berstis et al. ............ | 379/202.01 |

FOREIGN PATENT DOCUMENTS

CN 1708082 A 12/2005
WO 2006118651 A2 11/2006

OTHER PUBLICATIONS

Knowlin, Office Action Summary for U.S. Appl. No. 11/462,054 dated May 27, 2010, 13 pages.
Knowlin, Office Action Summary for U.S. Appl. No. 11/462,054 dated Nov. 12, 2010, 10 pages.
Addy, Notice of Allowance and Fee(s) Due for U.S. Appl. No. 11/462,054 dated Jul. 20, 2012, 5 pages.
Addy, Office Action Summary for U.S. Appl. No. 11/462,054 dated Sep. 15, 2011, 11 pages.

* cited by examiner

*Primary Examiner* — Melur Ramakrishnaiah
(74) *Attorney, Agent, or Firm* — Lisa Ulrich; Hoffman Warnick LLC

(57) ABSTRACT

The present invention provides a method, system, and program product for managing conference calls. Specifically, prospective conference call participants (e.g., moderators and/or invitees) will initially provide user profiles. A participant's profile will include, among other things, a set of contact numbers at which the participant can be reached. Thereafter, a moderator and a set of invitees of a conference call to be held are identified. This is typically done based on synchronization with a calendar application used to send and accept an invitation to the conference call. When the moderator later initiates the conference call, the present invention will access the profile of each invitee that accepted the invitation, and then call the invitees at the respective contact numbers set forth therein. When contact is made with an invitee, the call will be merged into the conference call with the moderator.

8 Claims, 4 Drawing Sheets

METHOD, SYSTEM, AND PROGRAM PRODUCT FOR CONTACTING CONFERENCE CALL PARTICIPANTS

CROSS-REFERENCE TO RELATED APPLICATION

This application is related in some aspects to the commonly owned and co-pending application entitled "Method, System, and Program Product for Managing Conference Calls", which is assigned application Ser. No. 11/462,054, and was filed on Aug. 3, 2006, the entire contents of which are herein incorporated by reference.

FIELD OF THE INVENTION

The present invention generally relates to conference call management. Specifically, the present invention provides a method, system, and program product for managing conference calls.

BACKGROUND OF THE INVENTION

With the continued growth of information technology, it is becoming increasingly common for co-workers to be remote from one another (not co-located). To this extent, tools such as conference calls are becoming vital for collaboration. Currently, in utilizing the conference calls, each individual in an organization/enterprise is given a unique conference call number and pass code that gives them the ability to hold a conference call session. For example, individual A might be assigned conference call number 800-555-4567 and pass code 123000, while another individual might be assigned conference call number 800-555-7897 and pass code 456000.

In order to arrange for a conference call, the moderator/administrator will send an invitation (to potential invitees) that includes the unique conference call number and pass code assigned to the moderator. When the time for the conference call arrives, each participant (moderator and invitee) must place a call to the unique conference call number assigned to the moderator, and then input the associated pass code. All participants who dialed in, and inputted the correct pass code will be joined in a conference call session. This requires that all participants make note or remember the unique conference call number and pass code of the moderator, and then dial into the conference call using the number and pass code at the appropriate time. Given that any collaborative group could have many individuals, the quantity of distinct conference call numbers and pass codes can be unlimited. Unless the invitees have access to their calendar application, which may have copied the conference call number and pass code from the original invitation, or can access a directory of conference call numbers and pass codes, the invitees will be forced to recall such information from memory.

In view of the foregoing, there exists a need for a solution that solves at least one of the deficiencies of the related art.

SUMMARY OF THE INVENTION

In general, the present invention provides a method, system, and program product for contacting conference call participants. Specifically, the present invention provides a conference call environment/infrastructure/system that contacts the conference call participants at the time of a conference call using contact numbers provided by the participants, and then merges the individual calls into the conference call. This obviates the need for the participants to dial into a conference call. Along these lines, under the present invention, prospective conference call participants (e.g., moderators and/or invitees) will initially provide user profiles. A participant's profile will include, among other things, a set (e.g., one or more) of contact numbers (e.g., office telephone number, home telephone number, cellular number) at which the participant can be reached. Thereafter, a moderator and a set (at least one) of invitees (collectively referred to herein as participants) of a conference call to be held are identified. This is typically done based on synchronization with a calendar application (e.g., Lotus Notes) used to send and accept an invitation to the conference call. (Lotus, Notes, and related terms are trademarks of IBM Corp in the United States and/or other countries). When the moderator later initiates the conference call, the present invention will access the profile of each invitee that accepted the invitation, and then call the invitees at the respective contact numbers set forth therein. When contact is made with an invitee, the call will be merged into the conference call with the moderator.

Under this system, the moderator can initiate the call in any manner. In one embodiment, the system will access the moderators profile, contact the moderator first using his/her provided contact numbers, and provide the moderator with prompts (e.g., telephonic) for activating the conference call. If the moderator is unavailable or fails to provide the prompts, the conference call will not be initiated and the invitees will not be contacted. Alternatively, the moderator could call in and initiate the call. This initiation could trigger the infrastructure to begin contacting invitees.

A first aspect of the present invention provides a method for contacting participants of a conference call, comprising: querying profiles for the participants of the conference call to identify a set of contact numbers for each of the participants; and contacting the participants using the set of contact numbers in response to initiation of the conference call.

A second aspect of the present invention provides a system for contacting participants of a conference call, comprising: a system for identifying the participants of the conference call; a system for querying profiles of the participants to identify contact numbers associated with each of the participants; and a system for contacting the participants at the contact numbers when the conference call is initiated.

A third aspect of the present invention provides a program product stored on a computer readable medium for contacting participants of a conference call, the computer readable medium comprising program code for causing a computer system to perform the following: query profiles for the participants of the conference call to identify a set of contact numbers for each of the participants; and contact the participants using the set of contact numbers in response to initiation of the conference call.

A fourth aspect of the present invention provides a method for deploying a system for contacting participants of a conference call, comprising: providing a computer infrastructure being operable to: query profiles for the participants of the conference call to identify a set of contact numbers for each of the participants; contact the participants using the set of contact numbers in response to initiation of the conference call; and merge the participants into the conference call.

A fifth aspect of the present invention provides computer software embodied in a propagated signal for contacting participants of a conference call, the computer software comprising instructions for causing a computer system to perform the following: query profiles for the participants of the conference call to identify a set of contact numbers for each of the participants; and contact the participants using the set of contact numbers in response to initiation of the conference call.

A sixth aspect of the present invention provides a business method for contacting participants of a conference call.

BRIEF DESCRIPTION OF THE DRAWINGS

These and other features of this invention will be more readily understood from the following detailed description of the various aspects of the invention taken in conjunction with the accompanying drawings in which.

Figure 1:
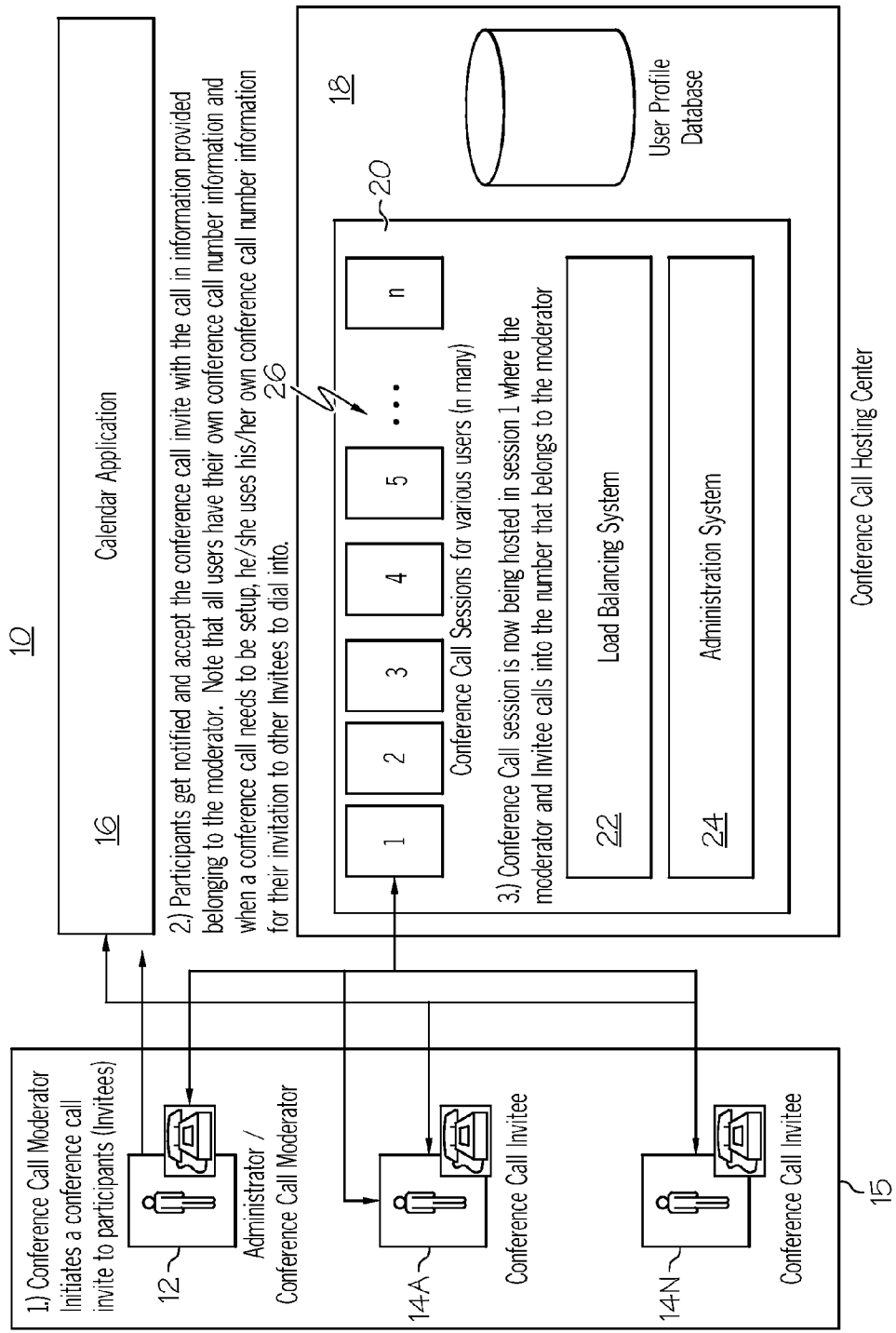
FIG. 1 shows a conference call environment according to the prior art.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
 I. General Description
 II. Computerized Implementation
I. General Description As indicated above, the present invention provides a method, system, and program product for contacting conference call participants. Specifically, the present invention provides a conference call environment/infrastructure/system that contacts the conference call participants at the time of a conference call using contact numbers provided by the participants, and then merges the individual calls into the conference call. This obviates the need for the participants to dial into a conference call. Along these lines, under the present invention, prospective conference call participants (e.g., moderators and/or invitees) will initially provide user profiles. A participant's profile will include, among other things, a set (e.g., one or more) of contact numbers (e.g., office telephone number, home telephone number, cellular number) at which the participant can be reached. Thereafter, a moderator and a set (at least one) of invitees (collectively referred to herein as participants) of a conference call to be held are identified. This is typically done based on synchronization with a calendar application (e.g., Lotus Notes) used to send and accept an invitation to the conference call. (Lotus, Notes, and related terms are trademarks of IBM Corp in the United States and/or other countries). When the moderator later initiates the conference call, the present invention will access the profile of each invitee that accepted the invitation, and then call the invitees at the respective contact numbers set forth therein. When contact is made with an invitee, the call will be merged into the conference call with the moderator.

Referring now to FIG. 1, a conference call environment 10 according to the prior art is shown. Under environment 10, a moderator 12 of a conference call will initially schedule a conference call using calendar application 16 (e.g., Lotus Notes). In scheduling the conference call, moderator 12 will select a date and time, and a set (at least one) of invitees 14A-N. Calendar application 16 will then transmit an electronic invitation to invitees 14A-N, who will then each accept or decline the invitation. In a typical embodiment, the invitation includes the unique conference call number and pass code for moderator 12. Upon acceptance of the invitation, this information will be populated into the appropriate date and time slot of invitees 14A-N respective electronic calendars maintained by calendar application 16 (and local components thereof). When the time arrives for the conference call, moderator 12 and invitees 14A-N (collectively referred to as participants 15) will dial into the conference call using the unique conference call number and pass code of moderator 12, as communicated in the invitation (i.e., the call-in information is moderator dependent). To this extent, moderator 12 and invitees 14A-N must either recall these values from their memory, have written them down, or be able to access their electronic calendars in order to dial in. Since the conference call number and pass code are unique to moderator 12, this is not an easy task for invitees 14A-N. This is especially not an easy task given that a collaborative could have a high quantity of individuals, who would each be forced to remember or record the unique conference call numbers and pass codes of all of their colleagues.

In any event, moderator 12 and invitees 14A-N will dial into conference call center 18 using the conference call number of moderator 12. As shown, conference call center 18 maintains a conference call application 20 shown including load balancing system 22 and administration system 24 that coordinates conference calls. Specifically, conference call application 20 will accept pass codes dialed in by conference call participants, and administration system 24 will commence a single conference call session 26 for all participants inputting the correct pass code. Load balancing system 22 ensures that sufficient bandwidth exists for maintaining scheduled conference calls.

The present invention addresses these issues by providing a conference call system that calls moderator 12 and/or a set (one or more) of invitees 14A-N for the conference call (session).

Figure 2:
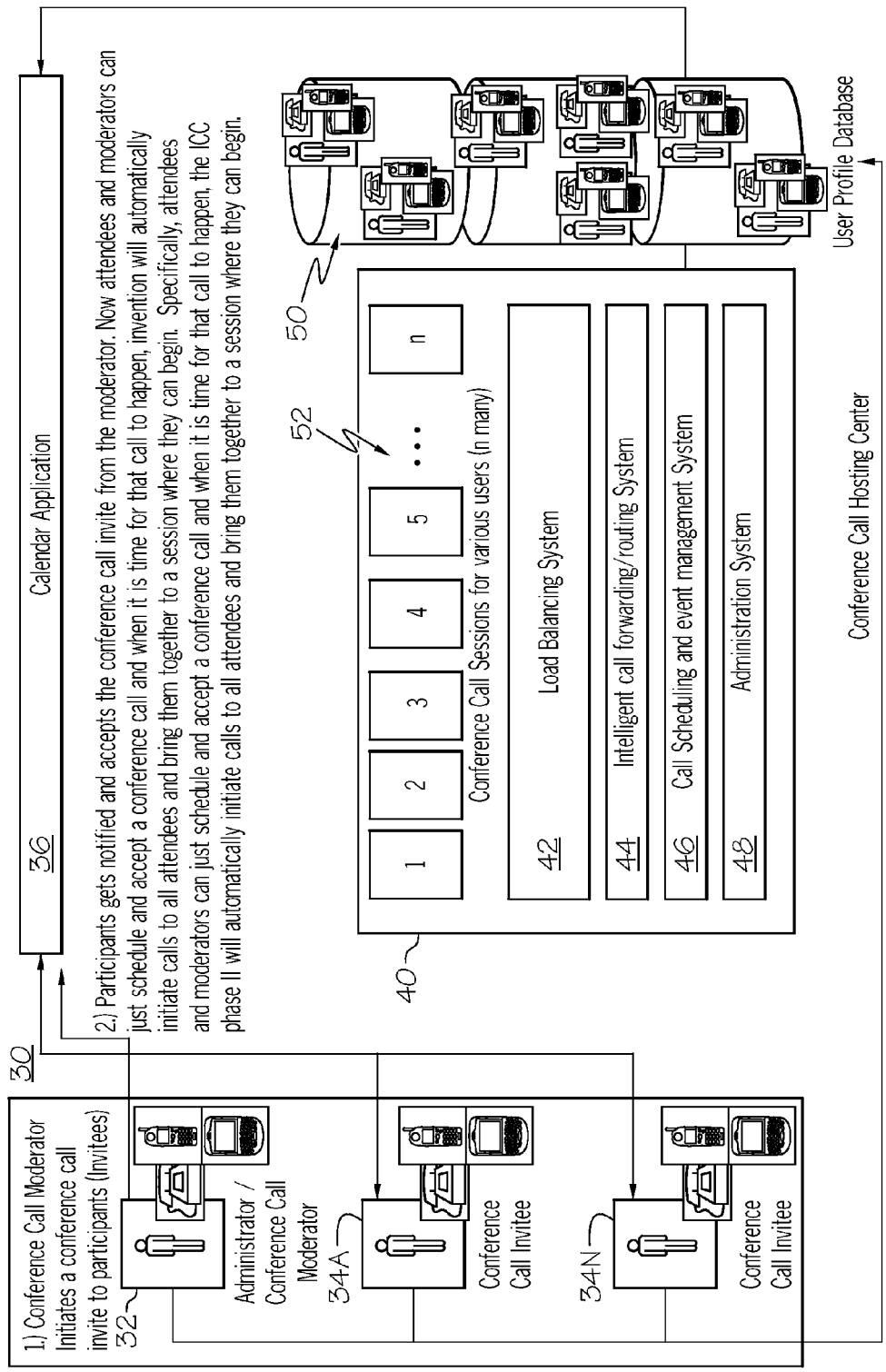
FIG. 2 shows a conference call environment according to the present invention.

Referring to FIG. 2, a first diagram of a conference call environment 30 according to the present invention is shown. Under environment 30, participants including moderator 32 and/or invitees 34A-N will use administration system 48 to establish (or have established) profiles within user profile database 50 and utilize various options and/or preferences as described below. Among other things, users (who will later become conference call participants) will provide in their profile contact numbers that conference call application 40 will later use to call invitees 34A-N (and optionally a moderator) of a conference call contact the attendees for conference calls. The contact numbers can be a range of cellular numbers, landline telephone numbers, LAN Line numbers, VoIP Soft/Physical Phones numbers, pager number, etc. As will be further described below, conference call application 40 can be programmed for a multiple calling scenario, where if a user cannot be reached at one number, conference call application 40 will failover to another. To this extent, users can set preferences or an order in which the contact numbers should be attempted by conference call application 40. In addition, via administration system 48, users have the ability to dynamically change their profile at any time to modify their contact information that is relevant to their current environment and situation. Users can also have the option to turn off this automated system to utilize dial their own unique conference call number as described in the above-incorporated patent application. Still yet, users can have the option to dynamically link a status indicator, whereby if a user is on "away", or "do not disturb" mode, call scheduling and event management system 46 will not call this specific user and will have the ability to periodically (such as in minutes or seconds depending on the settings chosen) query the status of the user and if status state changes to active, then call scheduling and event management system 46 will make that attempt to call.

In any event, once profiles have been established, a conference call can be scheduled in a fashion similar to environment 10 of FIG. 1. Specifically, moderator 32 will select a date and time, and use calendar application 36 to send electronic invites to invitees 34A-N. However, the invitation need not contain specific call-in information. Upon acceptance of the invitation, a notation for the conference call will be stored at the scheduled date and time in the electronic calendars of invitees 34A-N. Under the present invention, calendar application 36 will synchronize with call scheduling and event management system 46 of conference call application 40 so that the participants who will be attending are identified to conference call application 40 (e.g., based on their creation or acceptance of the invitation).

Figure 3:
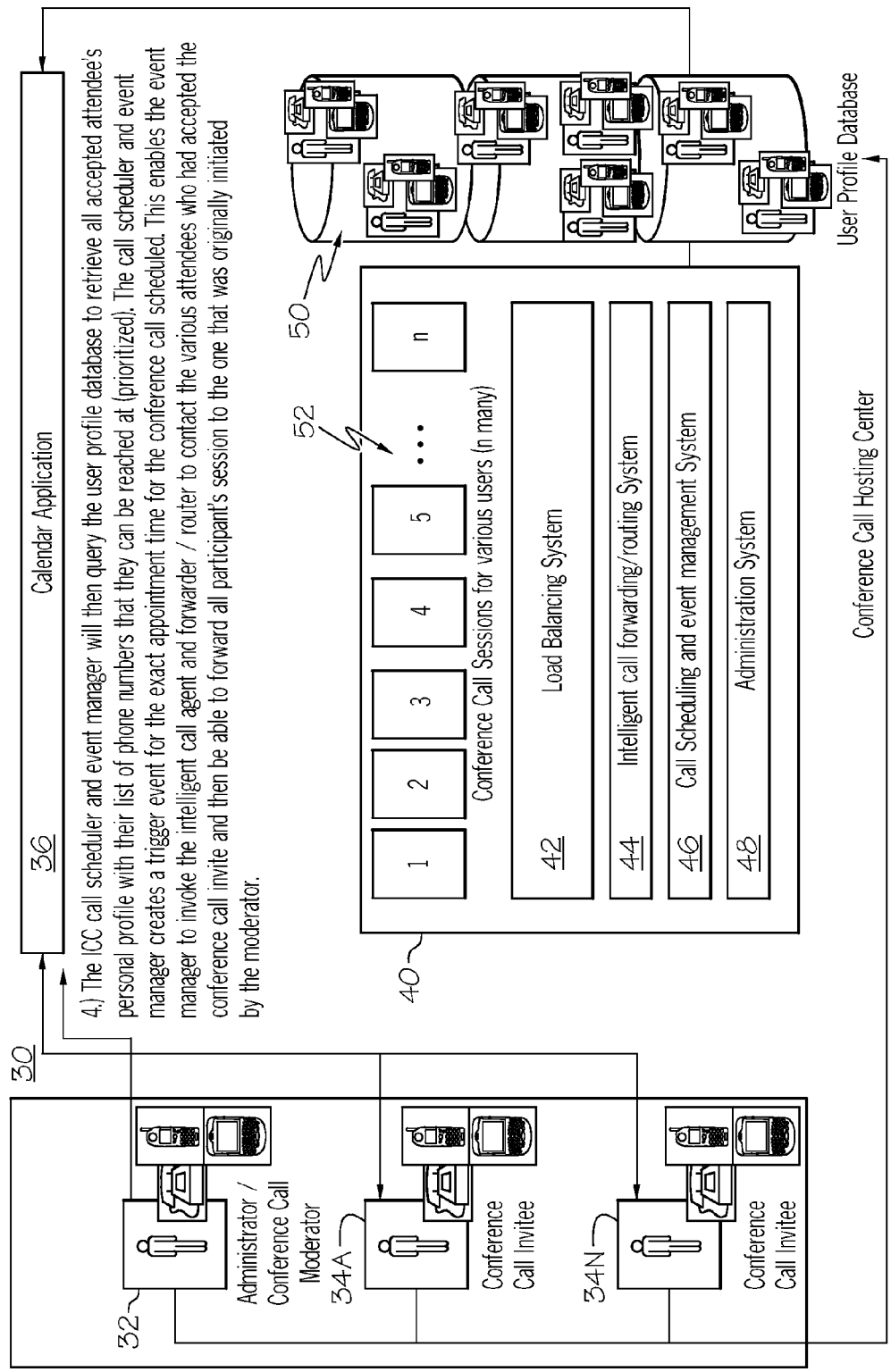
FIG. 3 shows a continuation of the conference call environment of FIG. 2 according to the present invention.

Referring now to FIG. 3, the process is continued. At a time of the conference call, a conference call session 52 is initiated. This can occur in multiple ways. In one embodiment, call scheduling and event management system 46 will query moderator 32's profile and place a call thereto using one of the set of provided contact numbers. Moderator 32 can then be prompted to initiate/activate the conference call (session 52). In another embodiment, moderator 32 can manually call into conference call center 40 and activate the conference call (e.g., using an alpha-numeric pass code).

Regardless, of how the conference call initiated, scheduling and event management system 46 will query user profile database 50 to retrieve all accepted invitee(s) 34A-N's personal profile with their list of contact numbers at which they can be reached (e.g., prioritized as described above). Scheduling and event management system 46 will also creates a "trigger event" for the exact appointment time and date for the conference call scheduled. At that time/date scheduling and event management system 46 will invoke intelligent call forwarding/routing system 44 to contact the various invitee(s) 34 who had accepted the conference call invite. Specifically, at the scheduled time/date, scheduling and event management system 46 (or intelligent call forwarding routing system 44) will call each invitee 34A-N that accepted (as well as moderator 32 if he/she did not called in to initiate the conference call) using each participant's prioritized set of contact numbers stored in their respective profiles. In trying to contact a participant 32 and/or 34A-N, conference call application 40 can be programmed to make a predefined number of passes (or spend a predefined amount of time cycling through the set of contact numbers (to account for busy or temporarily unavailable participants). As each participant 32 and/or 34A-N is contacted, a separate conference call session 52 will be commenced, and merged/forwarded into moderator 32's.

II. Computerized Implementation

Figure 4:
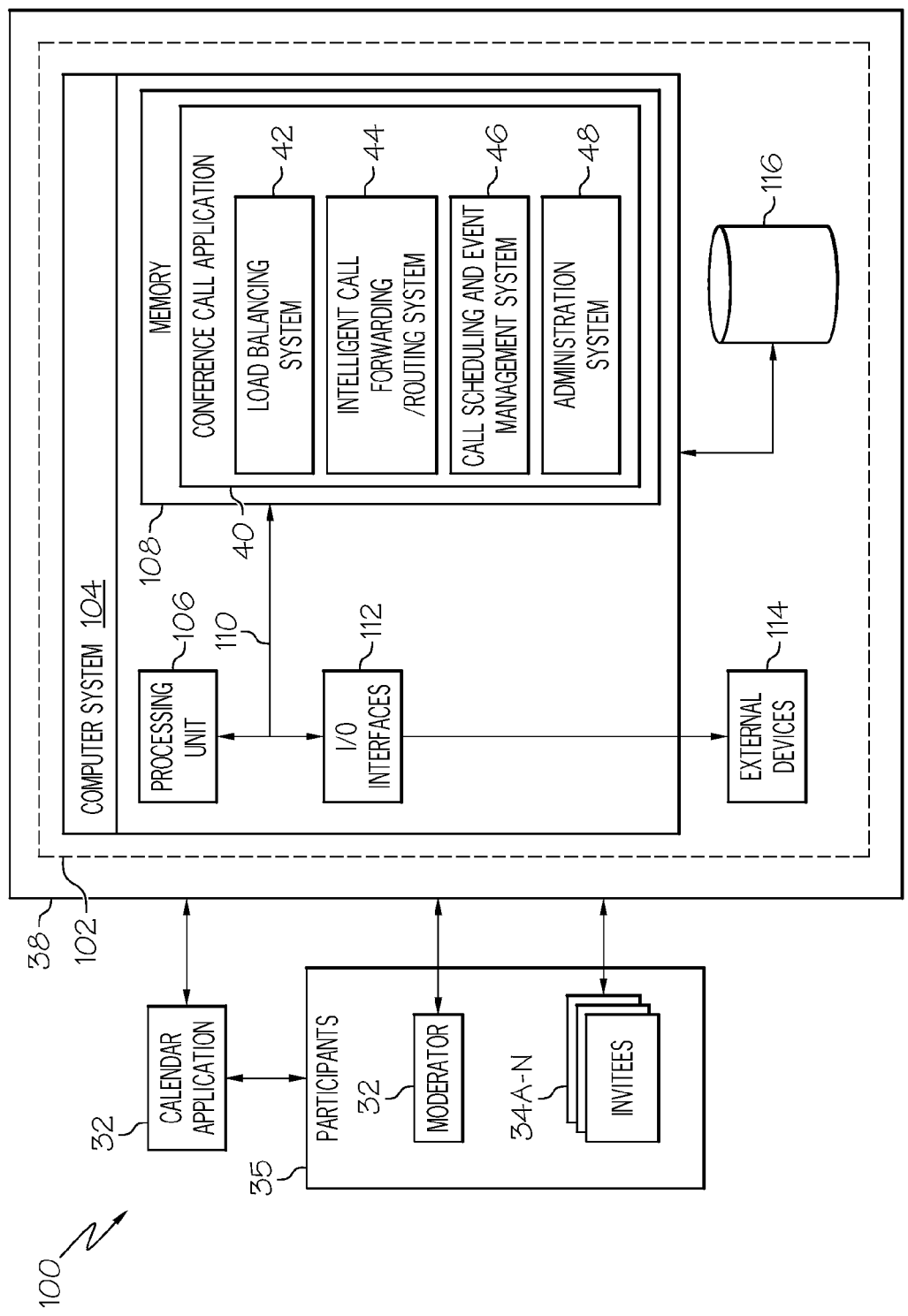
FIG. 4 shows a more specific computerized implementation of the present invention.

Referring now to FIG. 4, a more detailed diagram of a computerized implementation 100 of the present invention is shown. As depicted, implementation 100 includes a computer system 104 deployed within a computer infrastructure 102 such as that existing within conference call center 38. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as conference call application 40, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 4 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is conference call application 40, which includes load balancing system 42, intelligent call forwarding/routing system 44, call scheduling and event management system 46, and administration system 48. These systems perform the functions of the present invention as discussed above. Specifically, call scheduling and event management system 46 will synchronize with calendar application 36 so that a scheduled conference call, and invitees who have accepted the conference call invitation, can be identified. Thereafter, call scheduling and event management system 46 will query user profile database(s) 50 to identify a set of contact numbers for the participants 32 and 34A-N of the conference call (as provided by the individual participants or their agents).

When a conference call is initiated (e.g., by moderator 32 or conference call center 38), the individual profiles will be queried by call scheduling and event management system 46 to retrieve the respective sets of contact numbers for accepted participants. At this point call scheduling and event management system 46 will begin contacting the participants using their prioritized set of contact numbers. As indicated above, the present invention can be programmed to make cycle through the sets a predetermined number of times, or for a predetermined amount of time (e.g., an option that is set via administration system 48) in case a participant is temporarily unavailable at the time of the conference call.

While shown and described herein as a method and system for managing contacting conference call participants, it is understood that the invention further provides various alternative embodiments. For example, in one embodiment, the invention provides a computer-readable/useable medium that includes computer program code to enable a computer infrastructure to manage conference calls. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to contact conference call participants. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for contacting conference call participants. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for contacting participants of a conference call, comprising:
    scheduling a time for the conference call using a calendar application;
    electronically forwarding an invitation to each of the participants using the calendar application;
    receiving responses to the invitation from the participants using the calendar application;
    querying profiles for the participants of the conference call, based on the responses, to identify a set of contact numbers for each of the participants, each of the profiles having previously been established by a corresponding one of the participants;
    contacting the participants using the set of contact numbers in response to initiation of the conference call;
    if a participant cannot be contacted using a first contact number of the set of contact numbers, determining whether a second contact number has been established in a profile of the participant and, based on a positive determination, contacting the participant using the second contact number; and
    if a status of a participant of the participants indicates that the participant temporarily cannot be contacted, periodically querying the status and contacting the participant when the status changes.

2. The method of claim 1, further comprising merging the participants into the conference call in response to the contacting.

3. The method of claim 1, wherein the participants comprise a set of invitees to the conference call.

4. The method of claim 3, wherein the participants further comprise a moderator of the conference call.

5. The method of claim 1, further comprising establishing the profiles for the participants.

6. The method of claim 1, further comprising initiating the conference call before the contacting.

7. The method of claim 6, the initiating comprising contacting a moderator of the conference call using a contact number set forth in a profile of the moderator.

8. The method of claim 6, the initiating comprising receiving a call from the moderator to initiate the conference call.

* * * * *